United States Patent
Cok

(10) Patent No.: US 6,980,333 B2
(45) Date of Patent: Dec. 27, 2005

(54) PERSONALIZED MOTION IMAGING SYSTEM

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 749 days.

(21) Appl. No.: 09/832,462

(22) Filed: Apr. 11, 2001

(65) Prior Publication Data

US 2002/0149589 A1  Oct. 17, 2002

(51) Int. Cl.$^7$ .......................... H04H 1/387; G06K 15/00
(52) U.S. Cl. ...................................... 358/450; 358/3.28
(58) Field of Search ............................... 358/1.9, 3.28, 358/1.12, 530, 538, 442, 443, 450, 452, 453; 382/173, 176, 294; 348/46, 51, 50, 97, 185

(56) References Cited

U.S. PATENT DOCUMENTS

| | | | |
|---|---|---|---|
| 4,283,766 A * | 8/1981 | Snyder et al. .............. 382/293 |
| 4,521,014 A | 6/1985 | Sitrick ......................... 273/1 E |
| 4,710,873 A | 12/1987 | Breslow et al. ............ 364/410 |
| 5,478,238 A * | 12/1995 | Gourtou et al. ............ 434/100 |
| 5,745,160 A * | 4/1998 | Ishida et al. ............ 348/14.09 |
| 5,764,231 A | 6/1998 | Ray et al. ..................... 345/419 |
| 5,867,282 A | 2/1999 | Fredlund et al. ............ 358/450 |
| 6,047,130 A * | 4/2000 | Oles ............................... 396/1 |
| 6,191,777 B1 * | 2/2001 | Yasuhara et al. ........... 345/173 |
| 6,292,215 B1 * | 9/2001 | Vincent ....................... 348/169 |
| 6,402,615 B1 * | 6/2002 | Takeuchi ...................... 463/31 |
| 6,587,151 B1 * | 7/2003 | Cipolla et al. .............. 348/373 |
| 2002/0194006 A1 * | 12/2002 | Challapali .................... 704/276 |
| 2003/0028378 A1 * | 2/2003 | August et al. .............. 704/260 |

OTHER PUBLICATIONS

U.S. Appl. No. 09/738,747, filed Dec. 15, 2000, Kessler et al.

* cited by examiner

*Primary Examiner*—Jerome Grant, II
(74) *Attorney, Agent, or Firm*—Thomas H. Close

(57) ABSTRACT

A personalized motion imaging system, including: a computer; a motion image display device connected to the computer for displaying a motion image sequence to a viewer; a camera connected to the computer for capturing an image of the viewer; and an image processing program running on the computer for generating a real-time motion image sequence of an environment and integrating a motion image sequence of the viewer into the computer generated motion image sequence of the environment to produce a composite motion image sequence for display on a motion image display device.

27 Claims, 1 Drawing Sheet

PERSONALIZED MOTION IMAGING SYSTEM

FIELD OF THE INVENTION

The present invention relates to imaging systems that incorporate personal images in computer generated image sequences. More particularly the invention relates to such systems that include a camera for capturing an image of a viewer and incorporate the captured image into a computer generated motion image sequence.

BACKGROUND OF THE INVENTION

Digital motion imaging systems are traditionally used for both passive and interactive viewing. In the former case, pre-defined image sequences are presented to a viewer by, for example, a digital television or digital cinema experience. In the latter case, choices made by the viewer affect the images presented, for example in computer gaming. Passive viewing experiences are often created by mixing pre-stored image sequences (on videotape or film, for example) to create the experiences. Live (real-time) motion image sequences are often passively viewed as part of the electronic media, for example with sporting events, news shows, and the like. In contrast, interactive viewing experiences are commonly found as part of computer gaming activities in which a computer generates a scene that is generally rendered from a database of objects describing the scene. Viewer interaction through some interface device (such as a joystick or mouse) provides additional information for suitably rendering the scene.

The integration of images from multiple sources is often found as part of image sequence viewing experiences, both passive and interactive. For example, multiple scenes are presented within a larger scene or multiple image sequence sources are viewed simultaneously on a single image-sequence viewing device. However, these image sequences are not personalized, that is they do not include real-time motion image sequences of the viewers. Commercial experience has shown, for example with the Kodak Fantasy Theater and Thrill Ride imaging systems, that personalized images have a greater appeal to many image viewers than images without personalization. Moreover, for some applications, the integration of an image of the viewer himself or herself with a computer generated image sequence adds to the enjoyment of the viewing experience, for example with group gaming activities. In these applications, the presentation of participants within the image sequences viewed adds verisimilitude and additional enjoyment to the experience. See for example, U.S. Pat. No. 4,710,873, issued Dec. 1, 1987 to Breslow et al. which discloses incorporating a video still image of a viewer into an image sequence in an interactive display device. It is also known to provide interaction between multiple viewers within some imaging environments to enhance the enjoyment of viewers and improve the effectiveness of the imaging experience. See for example U.S. Pat. No. 4,521,014 issued Jun. 4, 1985 to Sitrick. The problem with these approaches is that the image of the viewer is static, thereby reducing the impact of the effect.

There is a need therefore for an improved real-time motion imaging system that provides personalization, improves communication, and does not require preparation.

SUMMARY OF THE INVENTION

The need is met according to the present invention by providing a personalized motion imaging system that includes: a computer; a motion image display device connected to the computer for displaying a motion image sequence to a viewer; a camera connected to the computer for capturing an image of the viewer; and an image processing program running on the computer for generating a real-time motion image sequence of an environment and integrating a motion image sequence of the viewer into the computer generated motion image sequence of the environment to produce a composite motion image sequence for display on a motion image display device.

ADVANTAGES

The present invention has the advantage that it provides a real-time motion imaging system that provides personalization, improves communication, and does not require preparation.

DETAILED DESCRIPTION OF THE INVENTION

Figure 1:
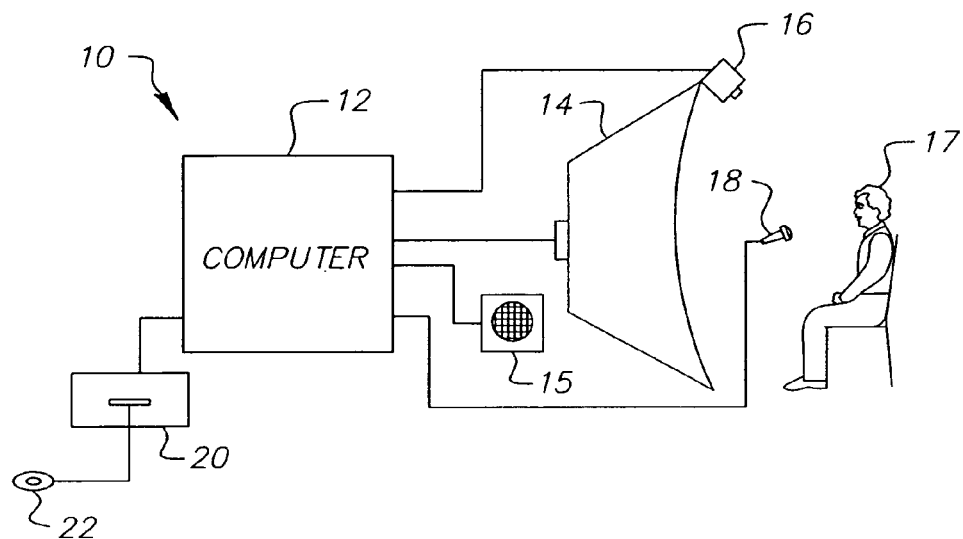
FIG. 1 is a schematic diagram showing an improved real-time motion imaging system according to the present invention.

Referring to FIG. 1, a personalized motion imaging system 10 includes a computer 12, a motion image sequence display device 14 connected to the computer, and a camera 16, such as a motion image camera, also connected to the computer. A variety of programs for compositing and animating image sequences can run on the computer.

The composition and animation of image sequences can operate in a variety of ways. In a first embodiment, a viewer 17 stations herself in front of the viewing device 14 and observes a motion image sequence generated by the computer 12. The camera 16 records the viewer in real-time and transmits an image sequence of the viewer to the computer 12. The computer 12 then composites the image sequence of the viewer with a computer generated image sequence to create a personalized, real-time image sequence and displays the personalized composite image sequence to the viewer. Known composition techniques using a blue or green screen to differentiate the subject from the background may be employed. See for example U.S. Pat. No. 5,867,282 issued Feb. 2, 1999 by Fredlund et al.

In an alternative embodiment, a still image of the viewer is captured by the camera 16 and transmitted to the computer 12. The computer then creates an animated image of the viewer using the still image and an animation routine. This animated image is then composited with the computer generated image sequence to form the personalized composite image sequence.

In either embodiment described above, the computer generated image sequence is generated from a stored set of image objects. The computer generated image sequence content is structured so as to complement the captured or animated personal image sequence. The computer generated image sequence is provided with locations in the individual images of the computer generated sequence where the individual images from the personalized image sequence or animation can be located so as to provide a suitable artistic and enjoyable sequence for the viewer. For example, in a game with opposing players, each of whom is controlling a virtual vehicle, the position of the vehicle operator can be fixed within the vehicle and a personalized image sequence composited into the vehicle operator position.

Figure 2:
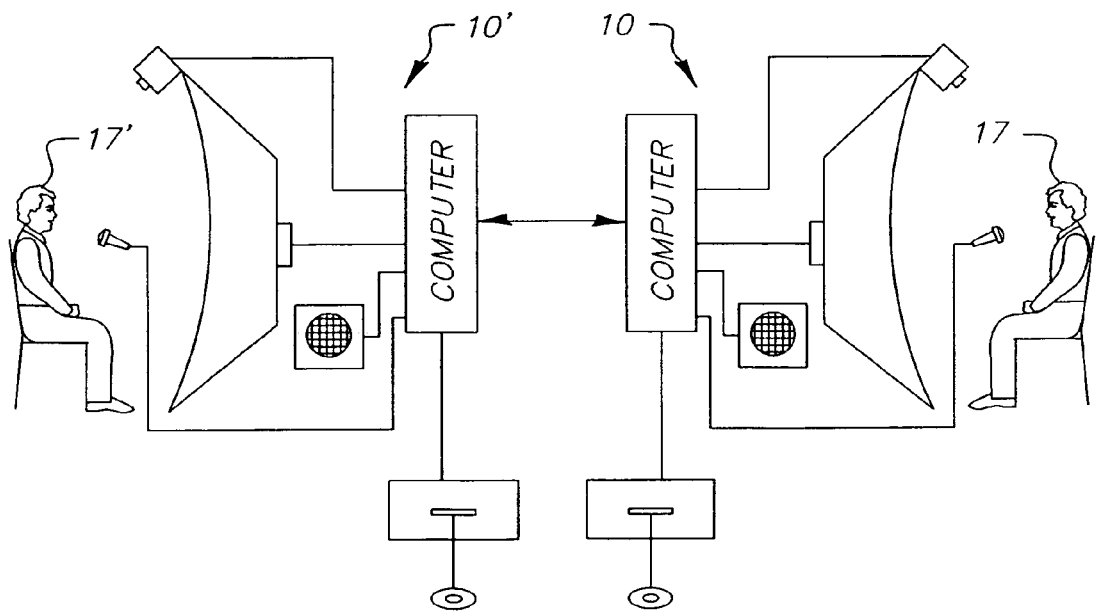
FIG. 2 is a schematic diagram of a system having a plurality of personalized motion imaging systems according to the present invention.

The present invention has applications for both single viewer environments and environments in which there are multiple viewers. For example, in the single viewer case a viewer sees an image of himself integrated into the image sequence he views. Referring to FIG. 2, in the multiple viewer case, a viewer 17 is seen by a second viewer 17' viewing a related scene displayed on a second personalized motion imaging system 10'. Each viewer sees the other person and/or herself in the image sequence. Both of these cases are applicable to computer game playing with either single or multiple players. The multiple viewer case can be extended to more than two viewers to the extent supported by the computer and the image sequences.

The verisimilitude of the imaging environment can be greatly enhanced with the use of stereo imagery and a stereoscopic viewing device. A computer generated stereo image sequence is composited with a personalized stereo image sequence to produce a stereo composite image sequence. The personalized stereo image can be acquired with the use of a stereo camera; multiple image acquisition of the viewer from different angles using a single camera; or by the generation of a stereo animation from either single or multiple still image(s) as known in the art.

The composite stereo image sequence may be viewed in a variety of ways. Stereo image goggles can be used, for example, but the viewer will appear in the image with the goggles. For conventional viewing without goggles, a monocentric autostereoscopic display device such as that disclosed in U.S. Ser. No. 09/738,747 filed Dec. 15, 2000 by Kessler et al., and now issued as U.S. Pat. No. 6,416,181 B1 may be used. Alternatively, other stereo display devices known in the art may be employed.

The personalized display system may be extended to include other means of interaction in a single- or multi-viewer environment. For example, a multi-sensory experience can be provided by including audio speakers 15 to provide sound to the viewer. These sounds are typically associated with the image sequence being viewed, as in a motion picture or a computer game with sound effects. In a multi-viewer environment, the sound effects can be augmented by verbal interactions between players. These verbal interactions can be implemented with the use of microphones 18 and audio mixing devices (either separate or integrated into the computer) for incorporating the verbal interactions into the image sequence sound track or sound effects.

In some applications, live verbal interactions between multiple viewers may not be desired. For example, a personalized representation of a viewer may utter pre-stored speech sequences stored within the computer. These speech sequences may be stored as digitized audio clips or synthesized in real-time from stored text. In any case, to the extent that the personalized image sequence, whether animated or not, can be seen to speak, the speech sequences are synchronized with the personalized image sequence. This capability is known in the prior art, for example with the RealSpeak product from Lemout & Houspie, and the animation products from LifeFX Networks, Inc.

It is also possible to add additional verisimilitude to an animated, personalized image sequence by artificially animating emotions corresponding to the content of the image sequence. A variety of facial expressions are known to connote particular expressions; by animating personalized facial expressions at appropriate moments, viewers may further enjoy the viewing experience and interaction with other viewers. Such emotional animation is known in the art, for example by LifeFX Networks, Inc.

A viewer's enjoyment of the imaging experience available through the present invention can be further enhanced with the addition of mementos of the experience. These can be provided by connecting an image output device 20 to the computer 12. This image output device 20 might write any of a variety of images on a variety of media, such as traditional hard-copy images, three-dimensional lenticular images, image sequences on videotape or digital versatile disks (DVD) 22, and the like. The image content may be drawn from the composited image sequence and may include multiple viewers and text reminiscent of the viewing experience. For example, a hardcopy print might be provided that includes a representative image from the composited sequence, suitable branding identification, personal images, and text describing the name of the experience and any scoring achievements. As another example, a DVD might be provided with the digital image sequence written thereon together with images of all of the participants. As another example, a lenticular image print might be provided that includes several selected scenes from the sequence incorporating personal images and experience identification. See for example U.S. Pat. No. 5,764,231 issued Jun. 9, 1998 to Ray et al.

The invention has been described in detail with particular reference to certain preferred embodiments thereof, but it will be understood that variations and modifications can be effected within the spirit and scope of the invention.

PARTS LIST 10 personalized motion imaging system
10' second personalized motion imaging system
12 computer
14 digital motion image display
15 audio speakers
16 camera
17 viewer
17' second viewer
18 microphone
20 output device
22 DVD

What is claimed is:

1. A personalized motion imaging system, comprising:
   a computer;
   a motion image display device connected to the computer for displaying a motion image sequence to a viewer;
   a camera connected to the computer for capturing an image of the viewer; and
   an image processing program running on the computer said program generating a computer generated motion image sequence of an environment and integrating a motion image sequence of the viewer into the computer generated motion image sequence of the environment to produce a composite motion image sequence for display on a motion image display device.

2. The system claimed in claim 1, wherein the motion image sequence of the viewer is captured by the camera in real-time.

3. The system claimed in claim 1, wherein the composite motion image sequence is displayed on the same motion image display device that is viewed by the viewer.

4. The system claimed in claim 1, wherein the composite motion image sequence is displayed on a motion image display device that is viewed by another viewer.

5. The system claimed in claim 1, wherein the camera is a stereo camera.

6. The system claimed in claim 1, wherein the motion image sequence is a stereo motion image sequence.

7. The system claimed in claim 6, wherein the motion image display device is a monocentric autostereoscopic display device.

8. The system claimed in claim 1, wherein the display further comprises a speaker for producing sounds associated with a displayed image sequence.

9. The system claimed in claim 8, further comprising a microphone for capturing spoken sounds from the viewer and wherein the computer includes means for integrating the captured sounds with the composite motion image.

10. The system claimed in claim 9, wherein the computer includes means for integrating recorded spoken sounds from the viewer with an animated image of a speaker within the composite motion image.

11. The system claimed in claim 8, wherein the computer includes means for integrating audio recordings with the composite motion image.

12. The system claimed in claim 8, wherein the computer includes means for synthesizing speech from stored text and integrating the synthesized speech with the composite motion image.

13. The system claimed in claim 8, wherein the computer includes means for synthesizing speech from stored text and integrating the synthesized speech with an animated image of a speaker within the composite motion image.

14. The system claimed in claim 1, wherein the motion image sequence of the viewer is generated by animating a still image captured by the camera.

15. The system claimed in claim 14, wherein the computer includes means for integrating audio recordings synchronized with an animated image of a speaker within the composite motion image.

16. The system claimed in claim 14, wherein the computer includes means for expressing animated emotions not apparent in the original image of the viewer.

17. The system claimed in claim 14, wherein the computer includes means for integrating audio recordings synchronized with an animated image of a speaker within the composite motion image.

18. The system claimed in claim 1, further comprising an image output device for recording selected images or image sequences from the composite motion image sequence or for recording other generated images, scenes, or text evocative of the composite motion image sequence.

19. A personalized motion imaging system, comprising:
a computer;
a camera connected to the computer, said camera capturing one or more images of the viewer; and
an image processing program running on the computer, said image processing program generating computer generated motion image sequence of an environment and integrating a motion image sequence of the viewer into the computer generated motion image sequence of the environment to produce a composite motion image sequence; and a motion display device connected to the computer, said motion image device displaying said composite motion image sequence to the viewer.

20. The system claimed in claim 19, wherein the motion image sequence of the viewer is generated by animating a still image captured by the camera.

21. A personalized motion imaging system, comprising:
a computer;
a camera connected to the computer capturing an image of the viewer;
an image processing program running on the computer, said image processing program generating a motion image sequence of an environment and digitally compositing a motion image sequence of the viewer into the computer generated motion image sequence of the environment to produce a composite motion image sequence; and
a motion image display device connected to the computer, said motion image display device displaying said composite motion image sequence.

22. The system of claim 21 wherein said image processing program generates said motion image sequence of an environment from a stored set of image objects.

23. A personalized motion imaging method comprising the steps of:
capturing an image sequence of a viewer;
generating a computer generated motion image sequence of an environment;
automatically compositing said viewer image sequence with said motion image sequence of the environment to provide a composite motion image sequence;
displaying said composite motion image sequence to said viewer.

24. The method of claim 23 wherein said displaying is concurrent with said capturing.

25. The method of claim 23 wherein said generating further comprises animating a still image captured during said capturing.

26. The method of claim 25 wherein said animating further comprises expressing animated emotions not apparent in said still image of the viewer.

27. The method of claim 23 further comprising integrating sounds with said the composite motion image sequence and producing said sounds during said displaying.

\* \* \* \* \*